US006504847B1

(12) United States Patent
Horlander

(10) Patent No.: US 6,504,847 B1
(45) Date of Patent: Jan. 7, 2003

(54) DEVICE INTEROPERABILITY

(75) Inventor: Karl Francis Horlander, Indianapolis, IN (US)

(73) Assignee: Thomson Licensing SA, Boulogne (FR)

( * ) Notice: Subject to any disclaimer, the term of this patent is extended or adjusted under 35 U.S.C. 154(b) by 0 days.

(21) Appl. No.: 09/269,243

(22) PCT Filed: Oct. 16, 1997

(86) PCT No.: PCT/US97/18750

§ 371 (c)(1), (2), (4) Date: Mar. 23, 1999

(87) PCT Pub. No.: WO98/17033

PCT Pub. Date: Apr. 23, 1998

Related U.S. Application Data

(60) Provisional application No. 60/028,651, filed on Oct. 16, 1996, and provisional application No. 60/031,249, filed on Nov. 12, 1996.

(51) Int. Cl.[7] ................................ H04L 12/28
(52) U.S. Cl. ................................ 370/431; 340/3.1
(58) Field of Search ................................ 340/3.1, 3.22, 340/3.9, 7.22, 7.2; 370/431, 522, 216, 218, 231

(56) References Cited

U.S. PATENT DOCUMENTS

| | | | | | |
|---|---|---|---|---|---|
| 5,031,175 | A | * | 7/1991 | Tanaka et al. | 370/216 |
| 5,343,469 | A | * | 8/1994 | Ohshima | 370/431 |
| 5,473,606 | A | * | 12/1995 | Hoekstra | 370/462 |
| 5,557,613 | A | * | 9/1996 | Kuwajima | 370/431 |
| 5,608,730 | A | * | 3/1997 | Osakabe et al. | 340/471 |
| 5,689,244 | A | * | 11/1997 | Iijima et al. | 340/3.9 |
| 5,712,834 | A | * | 1/1998 | Nagano et al. | 369/19 |
| 5,731,764 | A | * | 3/1998 | Tanaka | 340/3.9 |
| 5,835,020 | A | * | 11/1998 | Mizuta et al. | 340/3.1 |
| 5,838,248 | A | * | 11/1998 | Nagano | 340/27 |
| 6,300,880 | B1 | * | 10/2001 | Sitnik | 340/825.25 |

FOREIGN PATENT DOCUMENTS

| | | | |
|---|---|---|---|
| EP | 0221708 | 5/1987 | H04L/11/16 |
| EP | 0604166 | 6/1994 | H04B/1/20 |
| EP | 0658010 A1 * | 6/1995 | |

* cited by examiner

*Primary Examiner*—Edwin C. Holloway, III
(74) *Attorney, Agent, or Firm*—J. S. Tripoli; R. D. Shedd; D. T. Shoneman

(57) ABSTRACT

A system comprising a first device including a controller and a lock manager, a second device coupled to the first device by a bus, and a third device coupled to the first and second devices by the bus. The controller and the lock manager of the first device operate to establish an exclusive communication relationship between the first device and one of the second or third devices.

17 Claims, 5 Drawing Sheets

DEVICE INTEROPERABILITY

This application claims priority of provisional applications Nos. 60/028,651 and 60/031,249 filed Oct. 16, 1996 and Nov. 12, 1996 respectively.

FIELD OF THE INVENTION

The invention involves a system for communicating between multiple electronic devices, such as consumer electronic devices or the like, via interconnections such as digital data buses. More particularly, this invention concerns an arrangement for managing the interoperability of such devices.

BACKGROUND OF THE INVENTION

A data bus can be utilized for interconnecting electronic devices such as television receivers, display devices, videocassette recorders (VCR), direct broadcast satellite (DBS) receivers, and home control devices (e.g., a security system or a temperature control device). Communication using a data bus occurs in accordance with a bus protocol. Examples of bus protocols include the Consumer Electronics Bus, or CEBus, and the IEEE 1394 High Performance Serial Bus.

A bus protocol typically provides for communicating both control information and data. For example, CEBus control information is communicated on a "control channel" having a protocol defined in Electronics Industries Association (EIA) specification IS-60. Control information for a particular application can be defined using a form of programming language known as CAL (Common Application Language).

Consumer electronics devices are becoming increasingly complex and provide an ever-increasing number of features. While coupling these complex devices together via a data bus may be necessary to provide a complete audio-video (A/V) system, doing so creates numerous problems. For example, certain features of one device may require interaction with one or more devices coupled to the bus. A capability of one device may be needed to complete a particular operation in another device. Conflicts between the needs of various devices may occur.

At present, when more that one device competes for the use of a common resource, for example a third device connected on the network bus, the first in time controls the device. The other device cannot gain access to the common resource until the first device releases its hold the resource. This does not pose a problem in simple network, for example a network comprised of a television, a cable box, and a VCR. In such simple networks the VCR is "controlled" by the cable box, that is the VCR will only record what the cable box is providing. However, in more complex networks two devices, for example a cable box and a digital broadcast receiver, may compete for control of a shared resource, i.e., a VCR.

SUMMARY OF THE INVENTION

In many control applications it is desirable to discriminate against general access to a device. This discrimination usually benefits a single device. In such a case, a special relationship called "locking" develops, for either a short or long duration of time, between two devices. The locking relationship allows one device to control the access to a second device (i.e., a "locked device").

In general there are two types of locking approaches. In the first approach, the locked device determines if it can be unlocked andlor locked to another device. A request to lock the device is made directly to the locked device. If the locked device cannot satisfy the new request, the locked device polls the device which locked it (i.e., the locking device) to ascertain whether or not the existing lock can be terminated and a new lock be consummated. If the locking device does not respond, for example, in the event of a failure, the locked device terminates the lock and establishes the new lock. In the second approach, a device wishing to lock another device broadcasts a request over the network that any device having a lock on the desired device terminate its lock.

Generally, in accordance with the invention, a first electronic device comprises means for coupling to a data bus and control means for controlling communication via the data bus between the first electronic device and second and third electronic devices coupled to the data bus. The control means processes control and query data received from the second and third electronic devices for managing the communication relationships amongst these devices.

In accordance with one aspect of the present invention there is provided a device having a means for communicating with at least a second device interconnected by a network bus, thereby creating a relationship between said first mentioned device and said second device, said communication means being capable of receiving query data from a third device. Further, the device has a first means for storing information pertaining to the persistence of said relationship and a second means for storing information pertaining to a condition for terminating said relationship, and a means for controlling operating modes of said device in response to control data from said second device. The controlling means is capable of processing said relationship information and said query data and of terminating said relationship in response to one of said terminating condition and said query data.

In accordance with another aspect of the present invention the relationship information comprises one of a first state wherein said relationship is terminated in response to said query data and a second state wherein said relationship is maintained regardless of said query data.

In accordance with yet another aspect of the present invention the termination of said relationship in response to said query data comprises forming a new relationship between said consumer electronic device and said third device.

In accordance with still another aspect of the present invention the controlling means is capable of polling said second device, in response to the receipt of said query data to obtain permission to terminate said relationship.

In accordance with still another aspect of the present invention there is provided a system having a plurality of devices interconnected to one another by a network bus. Each device having a means for communicating, first and second means for storing information and a means for controlling the operating modes of said device as described hereinabove.

In accordance with a method aspect of the present invention a consumer electronic device connected on a network bus, the method comprises communicating with at least a second device interconnected by a network bus, controlling operating modes of said consumer electronic device, storing information pertaining to a persistence of said relationship and a predetermined condition pertaining to a condition for terminating said relationship, receiving query data from a third device, processing said information pertaining to said significance of said relationship and said query data, and terminating said relationship in response to one of said terminating condition and said query data.

BRIEF DESCRIPTION OF THE DRAWING

The invention may be better understood by referring to the enclosed drawing in which.

Figure 1A:
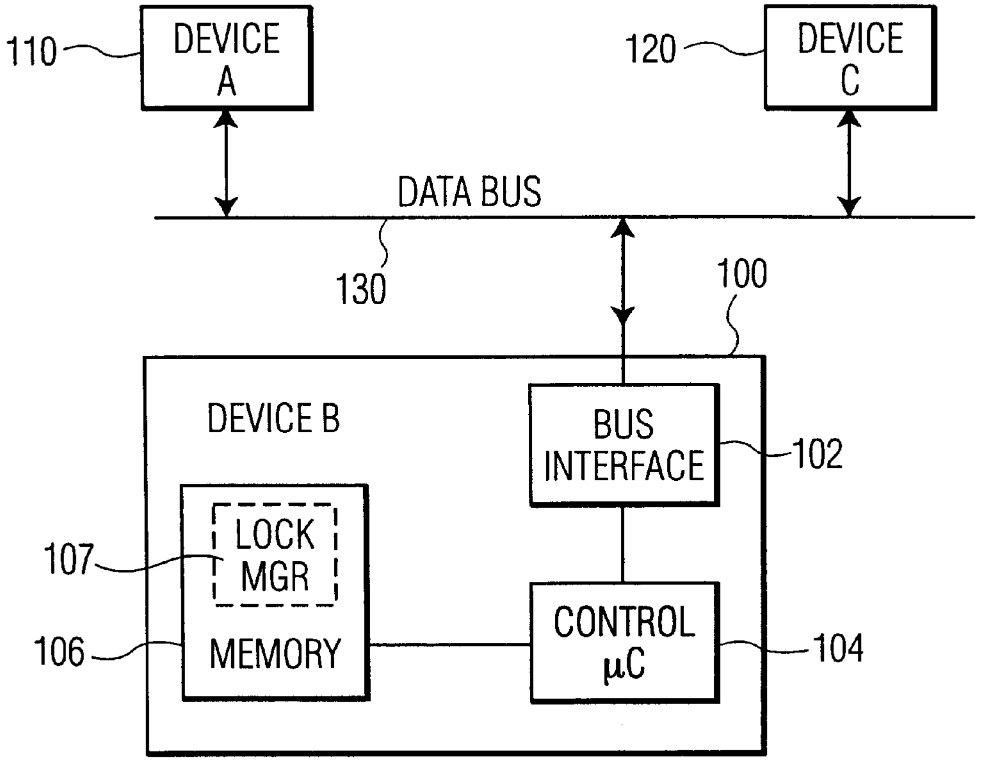
FIG. 1A shows, in block-diagram form, a system of electronic devices coupled together using a data bus.

In the drawing, reference numerals that are identical in different figures indicate features that are the same or similar.

DETAILED DESCRIPTION OF THE DRAWINGS

FIG. 1A shows a system including three electronic devices A, B and C, identified by reference numerals 110, 100 and 120, respectively, that are coupled together via data bus 130. Devices A, B, and C may be various types of electronic devices including consumer electronic devices such as audio and/or video signal processing devices and home control devices. Specific examples of consumer electronics devices include television (TV) receiver, display devices, cable boxes, video tape recorder (VTR or VCR), direct broadcast satellite receivers (such as a DSS satellite receiver), compact disc (CD) units, digital video disc (DVD) units. Home control devices include security devices (e.g., cameras, locks), remotely controlled switching devices, and environment control devices (e.g., heating, cooling). A system incorporating principles of the invention may include more than the three devices shown in FIG. 1A. Also, each device may be a different type of device. For example, a system in accordance with the invention might include numerous devices throughout a home including TV, VCR, cable box, satellite receiver, audio system, and home control devices.

In the example shown in FIG. 1A, data bus 130 includes multiple signal paths for communicating data and control information between the devices. The bus structure may be serial or parallel. Data communication on the bus may be in accordance with any one of a variety of bus protocols such as the CEBus or IEEE 1394 protocols identified above. Data communicated via bus 130 can include video and audio data. For example, a satellite receiver receiving a digital video signal could transfer digital video and audio data via bus 130 to a digital tape recorder (DTR) for recording.

Device 100 includes bus interface unit 102 for coupling device 100 to bus 130. Bus interface 102 includes hardware suitable for receiving data from bus 130 and for transmitting data on bus 130. For example, interface 102 may include registers or buffer memory for receiving and temporarily storing data from bus 130 until device 100 is ready to process the data, and for storing data until ready for transmission on bus 130.

Interface 102 is controlled by control microcomputer (μC) 104. The term "microcomputer" is intended to represent various devices including, but not limited to, devices such as microprocessors, microcomputers, controllers, and control computers that are implemented using one or more integrated circuits and/or discrete components. Microcomputer 104 controls the passing of data between interface 102 and other units within device 100 such as signal processing units (not shown in FIG. 1A). For example, if device 100 is a DTR and bus interface unit 102 is receiving digital video data for recording, μC 104 ensures that interface 102 passes video and audio data to signal processing circuitry within device 100 such that recording occurs as intended. Also, μC 104 controls interface 102 so that interface 102 communicates data to and from bus 130 in accordance with the appropriate bus protocol.

Microcomputer 104 implements the desired bus protocol under control of a control program and data stored in memory 106. Memory 106 may include various types of memory including RAM, ROM, EEPROM, and hard drive or other types of bulk storage devices. The control program may include routines for controlling functions of bus interface 102 such as enabling or disabling communication, coordinating bus operations with other operations within device 100, and formatting data for bus communication.

One aspect of controlling bus interface 102 that is provided by μC 104 is determining how to resolve conflicting requests for use of resources within device 100. For example, consider the situation in which device 110 is a cable box, device 120 is a DSS satellite receiver and unit 100 is a video tape recorder (VTR). A user may program VTR 100 to begin recording a particular program via cable box 110 at a particular time. A conflicting command causes DSS unit 120 to attempt to access VTR 100 while it is recording the program via cable box 110. Conventional systems resolve the described problem by either ignoring the attempted access by DSS unit 120 or by notifying the user that VTR 100 is unavailable.

Figure 1B:
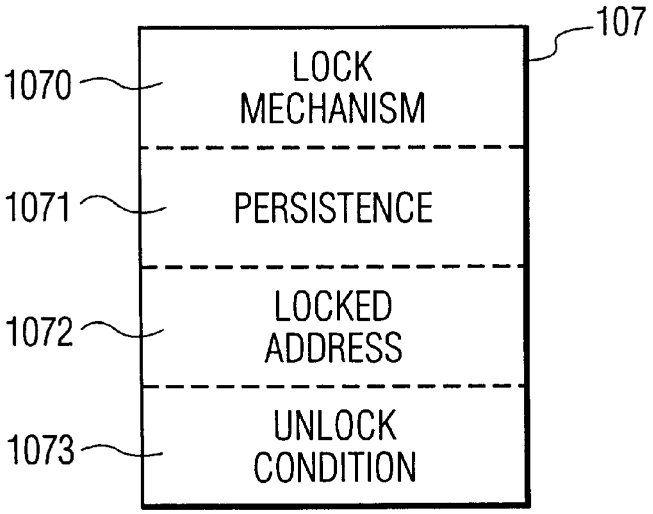
FIG. 1B shows, in block-diagram form, further detail of a portion of the system shown in FIG. 1A.

In accordance with an aspect of the invention, the system shown in FIG. 1A implements a lock manager for resolving resource conflicts in a manner described in detail below. In the exemplary embodiment shown in FIG. 1A, μC 104 operates under control of a "lock manager" routine included within the bus control program to insure that device 100 resolves conflicts in a manner described in detail below. A "lock mechanism" 1070 routine is also be included within the bus control program; the operation of lock mechanism 1070 is described in the detailed description of FIG. 2 below. The lock manager provides for establishing communication relationships, or locking conditions, between devices coupled to bus 130 and for determining under what conditions these relationships are modified. Operation of the lock manager involves parameters that are stored in a portion 107 of memory 106 and will be described in more detail below. Parameters associated with a lock relationship that are involved in resolving a conflict are stored within the lock manager region 107 of memory 106 in FIG. 1A. Three such parameters are persistence, locked address, and unlock condition. FIG. 1B illustrates these three parameters being stored as three separate entries 1071, 1072, and 1073 in memory region 107. It should be noted that, although not shown in FIG. 1A, devices 110 and 120 each include features that provide functionality similar to that described herein as being provided by units 102, 104, 106 and 107 within unit 100. The structure within units 110 and 120 may be similar to that shown within device 100, but similar functionality could be produced using other arrangements also.

As an example of the operation of the lock manager, consider the conflict example described above. Using the lock manager, recording a program from cable box 110 using VTR 100 involves the bus control capability of cable box 110 transmitting a lock request to VTR 100. The lock request asks VTR 100 to establish a relationship, i.e., to establish a locked condition, with cable box 110. Microcomputer 104 receives the lock request via bus interface unit 102 and determines whether or not VTR 100 is already locked to another device. If not, i.e., the VTR is available for locking, VTR 100 sends a reply to cable box 110 indicating that the lock has been established in lock mechanism 1070. Recording of the desired program from cable box 110 proceeds and the lock relationship prevents interruption of the recording except under certain conditions that are defined by parameters such as persistence and unlock condition described above and, in more detail, below, that are associated with the lock relationship. The value of these parameters is established by the locking device, i.e., the unit initiating the lock condition (cable box 110 in the present example) and are transferred to and stored in the locked device (the VTR in the present example) in respective portions of region 107 of memory 106. When DSS unit 120 requires use of VTR 100, lock manager capability within DSS unit 120 sends a lock request to VTR 100. Because a pre-existing lock relationship exists between VTR 100 and cable box 110, the lock manager within VTR 100 processes the lock request from DSS 120 in accordance with the parameters of the existing lock condition stored in VTR 100 and resolves the conflicting request in the manner described below.

Figure 2:
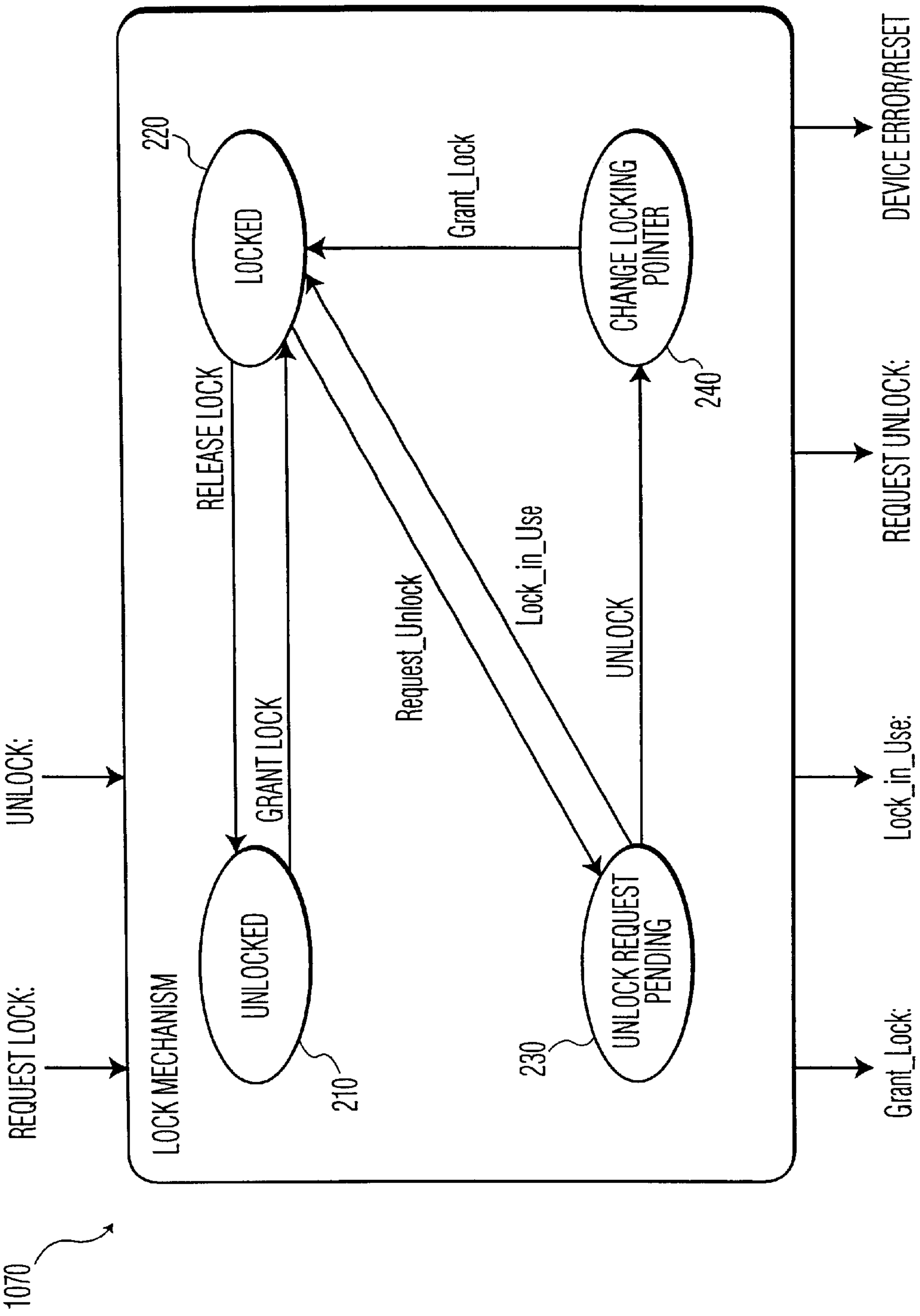
FIGS. 2 through 7 show flow diagrams illustrating.. the. operation of the system shown in FIG. 1.

FIG. 2 illustrates the operation of the locking mechanism 1070 which cooperates with lock manager 107. Lock manager 107 manages the relationships or locks that a "master device" initiates. Lock mechanism 1070 carries out the locking of the two devices together. When a master device desires to initiate a lock it sends a command to the slave device. A device may be in any one of various states involving lock control. Four such states, unlocked, locked, unlock request pending, and change lock pointer, are illustrated by ovals 210, 220, 230 and 240 in FIG. 2. Transitions between the states are illustrated by lines connecting the ovals. As shown at the top of FIG. 2, a lock manager can receive requests including lock and unlock requests. As shown at th e bottom of FIG. 2, a lock mechanism can p roduce responses such as "grant_lock" or "lock_in_use" in response to requests. Also, a lock mechanism can produce an unlock request and a device error/reset indication.

As shown in FIG. 2, the system transitions from unlocked state 210 to locked state 220 in response to a lock request and issues a grant_lock response. A return to unlocked state 210 from locked state 220 occurs in response to a lock being released. Lock release occurs by transitions through states 230 and 240. In response to an unlock request, the system moves from state 220 to unlock request pending state 230. At state 230, the system processes parameters such as the persistence parameter and the unlock condition to determine whether a lock should be released. If the lock will not be dissolved, a lock_in_use message is sent and the system returns to locked state 220. If the lock can be dissolved, an unlock message is issued and the system transitions to state 240 in which the locked address, or locking pointer, is changed to that of the device now requesting a lock. Subsequently, the system transitions to locked state 220 and issues a grant_lock message.

Figure 3:
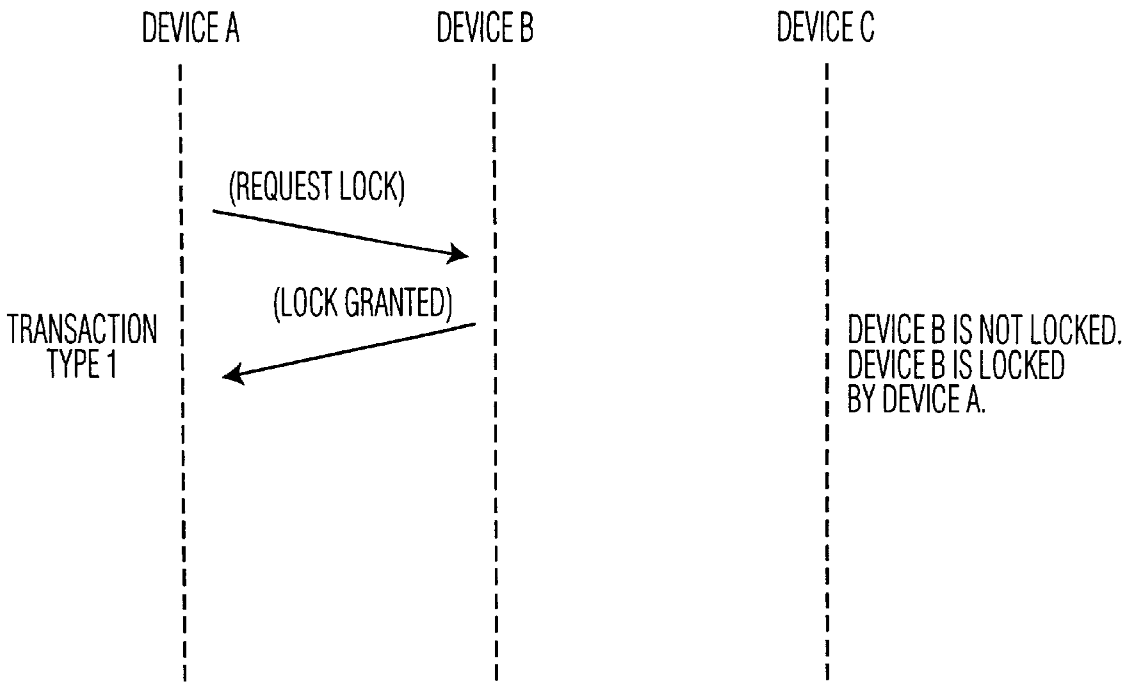

The operation of the lock manager 107 and lock mechanism 1070 under various conditions, i.e., during various types of transactions between devices, is illustrated in FIGS. 3 through 7. In FIG. 3, a device B is not locked and, in response to a lock request from device A, device B establishes a lock with device A.

Figure 4:
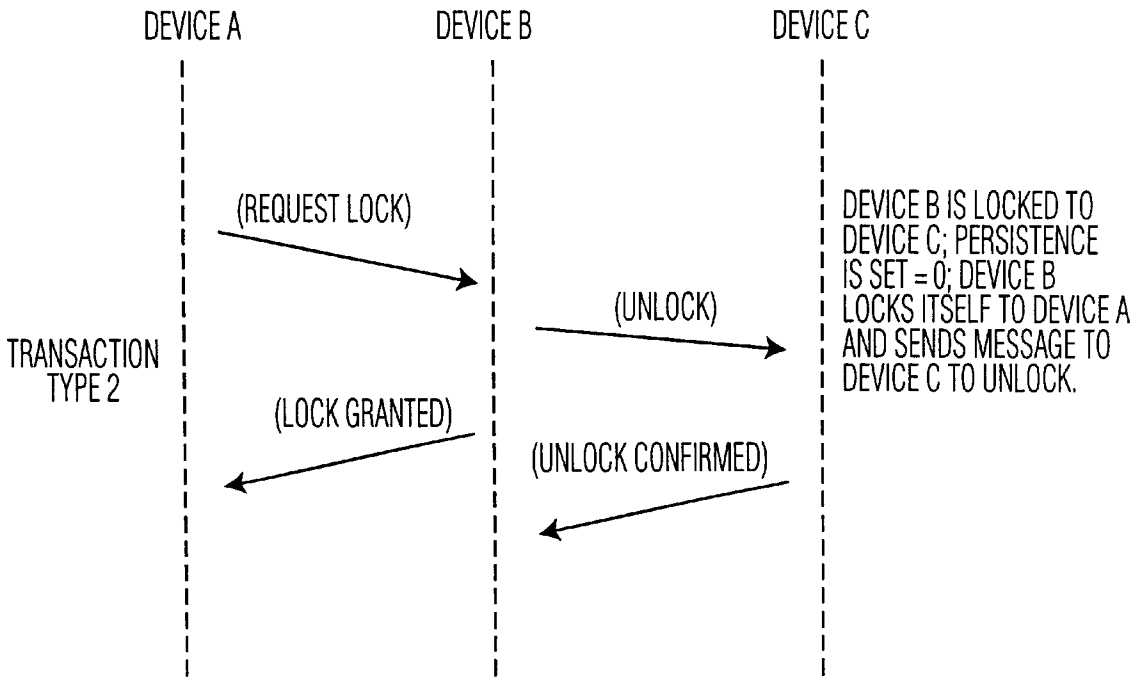

In FIG. 4, device B is locked to device C in response to a previous lock request and receives a conflicting lock request from device A. The persistence parameter is set at 0 meaning that device B need not request approval of unlocking from device C prior to unlocking and re-locking with device A. Device B must only evaluate the unlock condition parameter to determine whether or not to dissolve the lock with device C.

Figure 5:
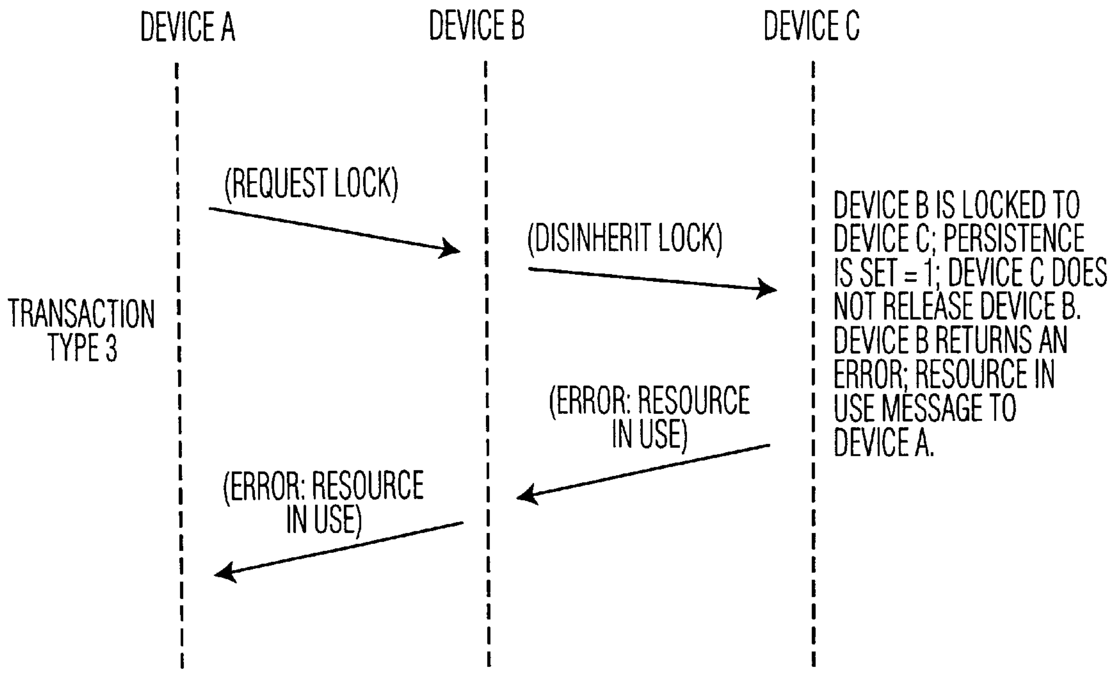

In FIG. 5, device B is locked to device C in response to a previous lock request from device C and the persistence parameter is set to 1. Device B sends an unlock request, also referred to as a "disinherit lock" request, to device C. The lock manager in device C determines whether to release the lock or not. In FIG. 4, device C decides to maintain the lock and sends a "resource in use" message that is relayed to device A by device B.

Figure 6:
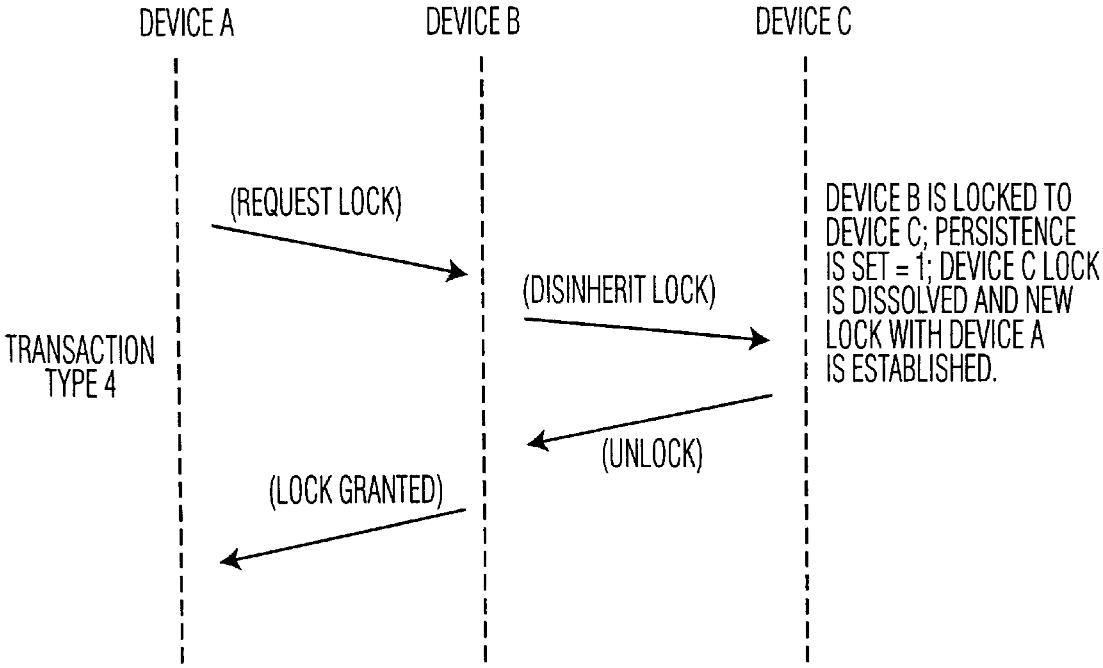

FIG. 6 shows a transaction similar to that in FIG. 4 (i.e., persistence =1) except that device C responds to device A's lock request by dissolving device C's lock with device B. Thus, device C sends an unlock message to device B and device B subsequently grants a lock with device A.

Figure 7:
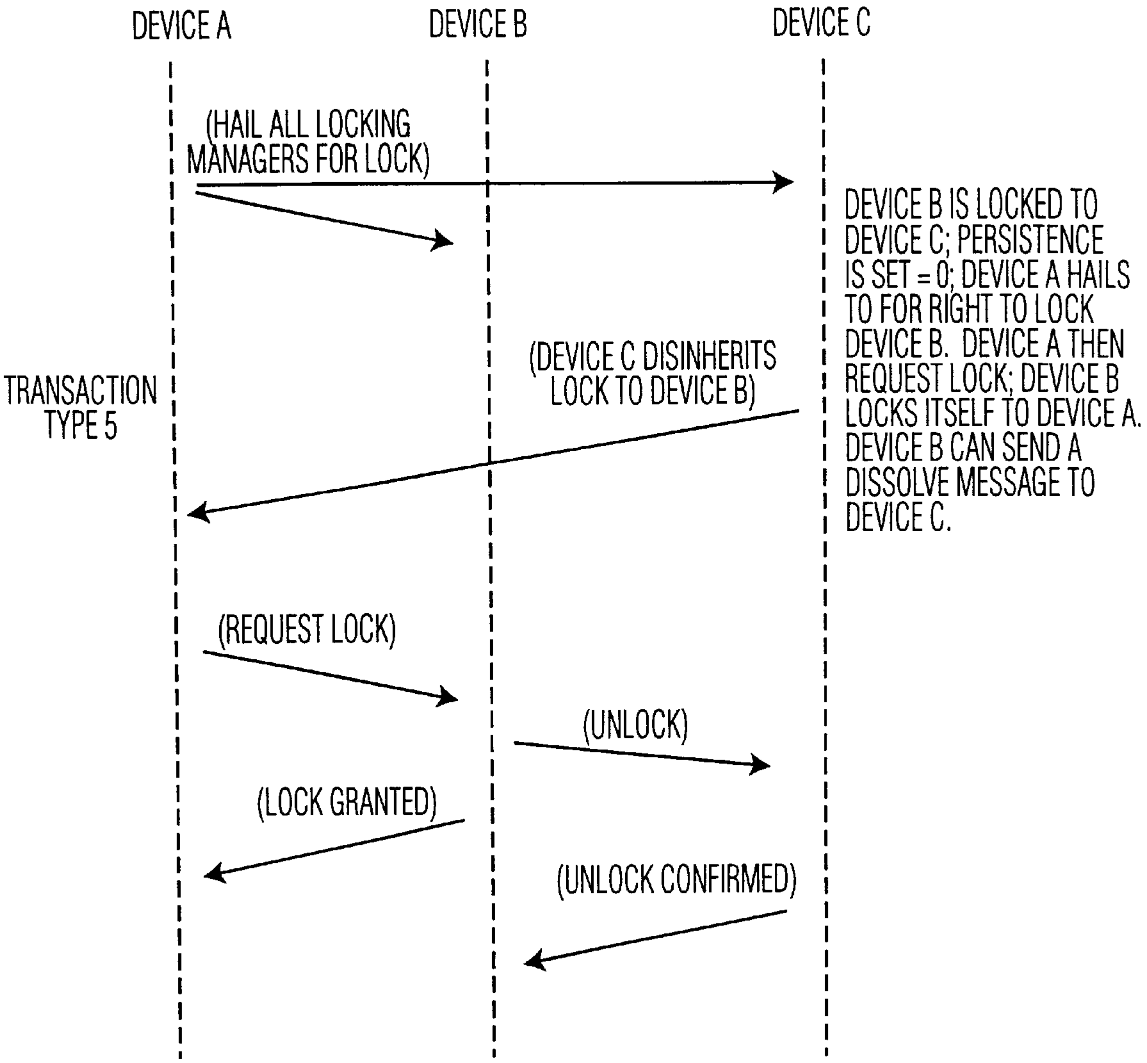

FIG. 7 shows a transaction in which device B is locked to device C with the persistence equal to 0 and device A hails all locking managers indicating device A's desire to lock with device B. Device C notifies device A that device C will release its lock with device B. Device A then sends a lock request to device B and, because the persistence parameter is set to 0, device B locks to device A and can send a message to device C instructing device C to dissolve the lock with device B.

Further it is within the scope of the present invention that only locking or master devices require lock managers 107 and that slave or lockable devices only employ lock mechanisms 1070. The operation of such a system is similar to the system described herein.

Further details regarding the lock manager aspect of the invention, including features of the lock manager in addition to those already described, are described below. For convenience only, the following detailed description includes aspects based on utilization of the CAL Programming Language; however, it should be noted that any suitable alternate programming language may be substituted therefor.

Examples of Applications using Locking

The following describes application in addition to those already described in which a locking relationship is required. In a first example, a device ("Device A") desires to download several packets of data into a remote device ("Device B"). Device A does not want the data placed in Device B to be overwritten until the downloading is complete. Normally, this function requires a Segmented Network Service in both devices. However, in accordance with this invention, Device A sets up a temporary locking relationship that insures it is the only device capable of writing to Device B. After the data transfer, Device A terminates the locking relationship and, "unlocks," Device B.

In a second example, an external device, such as a cable box, executes a program timer event. The cable box "locks" the VCR transport mechanism. This keeps the VCR in the record mode until the session ends or an override condition occurs. The cable box sends a Stop command to the VCR and unlocks the VCR at the end of the event.

In a third example, a device desires to display an OSD message for a period of time. The device locks the display to itself and sends the relevant display information. This display device displays the information for a period of time. The locked device is unlocked by either the locking device itself or by a conditional event, for example a time out.

A special form of locking, "listening", is also implemented. Controlling and inter-operating with various devices requires the ability to know their status. A device that contains listening capability discriminates between broadcast reports sent out by a particular group of devices, e.g., devices located within a house.

For example, status change information is automatically sent from one device to another. A VCR updates its motion mode status to a display device or a temperature sensor sends an update to an environmental manager. There are two problems with this approach. The first problem is determining where the report should go. The companion problem is for the receiving device to determine what reported information is important to its function. This occurs when there are multiple instances of the same device type, such as thermostats or security sensors, reporting to various subsystems in the same house. There is a need to discriminate between sources of information. The listening function accomplishes this function.

There are various applications of listening. Some are more dynamic than others. Environmental control is an example of stable (static) listening application. In such a system, the listening functions are relatively static after an initial setup function. These systems require a reliable and inexpensive means for listening. Issues such as security and special access are important. The system configuration occurs at installation and rarely changes with great frequency.

This is in stark contrast to an A/V system. An A/V system is very dynamic. Devices are installed and removed with relative frequency. Source of video and request function cause the systems configuration to change rapidly and regularly. Playback, Record, Display message, and Timer Events all require changes in the listening and locking of device. There is a need to change the listening source device from VCR to a DBS device in an instant. There is also a great deal of inter-device listening. A TV may be listening to one device, an environmental system, for display while a cable box is listening to the status of a VCR.

There are various levels of locking and listening desired. In many instances, an application requires only a device level locking. However, there are cases when it is desirable to lock at an object level. (That is, a device may be comprised of more than one object, for example a device may have separate controllable functions within the device itself.) Once such situation is a VCR application where it could be desirable to lock the transport mechanism while allowing other devices to edit or add timer events. Likewise, although it is desirable to lock the display object in a TV to guarantee proper display, it is not desirable to lock the devices' ability to respond to other communications.

The locking attribute has relational, conditional and inherited characteristics. An example of a conditional locking characteristic is when an object is already locked by a device. The unlocked objects are lockable; however, the device may not be lockable. In such a situation, the device is lockable only by the same device that locked one of its object. Inherited locking infers that all the objects in a device inherit the locked status of the object.

The Lock Manager

All devices that desire to lock other devices must have a "Lock Manager" which keeps track of all the active locks initiated by the device and is responsible for locking and unlocking remote devices. A structure of such a lock manager, implemented in CAL is provided below.

Lock Manager (16) DataList Memory
This provides a central clearing house for locks established by the device.

| IV | R/W | Type | Name | Context Function |
|---|---|---|---|---|
| a (61) | R | n | number_of_locks | size_of_memory |
| b (62) | R | n | Length_of_lock | length_of_record |
| | | | _pointer | |
| C*(43) | R/W | n | current_lock | current_index |
| I*(6c) | R/W | d | lock_pointer | memory_block |

The above delineated parameters are described hereinbelow.

1. Lock_Pointer Definition

Each record of the Data Memory memory_block instance variable (IV) is a pointer to the locked device, residing remotely on the network. The lock_pointer data includes three fields: (1)<Device_Network_Address; (2) <Locked_Context_ID>; and (3) <Locked_Object_ID>. Those fields that are left blank are considered as null.

The Device Network Address field is the network address of the locked device. In a CEBus application, the MAC address is used as the network address.

The Locked_Context_ID field contains two bytes. The first byte is either a Context number or the context wildcard "DE". The DE wild card implies that the lock corresponds to all the instanciations of the same context in the device. The second byte is the Context_Class_ID. The remaining bytes are null.

The Locked_Object_ID field is split into two bytes. The first byte is either the Object_Number or the Object wild card "00". When the object wild card is used the second byte is the Object_Class. When the wild card is not used, the second byte is null. This allows the locking of all objects within the same Object Class.

2. Unlock Message Definition

The locked device sends an unlock message to the Locking Manager. There are three defined unlock messages: (1) Device_Unlock; (2) Context_Unlock; and (3) Object Unlock.

The unlock message is sent using a Macro, U4. The U4 macro contains two argument fields. The first argument contains the Device_Network_Address. The second argument contains the context and object information. The macro prototype is "<context_ID><object_ID>U4<data token><size of data><escape token><Device_Network_Address>F5><data token><size of data><escape token><Context_Number><Context_Class_ID><Object_ID><Object_Class>"

When a context is locked the Context_Number and Context_Class_ID are placed in the second argument field, (the Object_ID and Object_Class are not supplied). The object information is null.

When an object is locked, the Context_Number, Context_Class_ID, Object_ID and Object_Class are also supplied in the second argument.

a) Device Unlock Message

The Device_Unlock message must contain the locked device's <Device_Network_Address>. The second argument is not contained in the message.

"00 04 55 34 F5 F5 F4 34 F6<Device_Network_Address>F5"

Examples of Locking Pointing Vectors Placed in the Lock Manger Object

| | Device Network Address | Locked_Context_ID | | Locked_Object_ID | |
|---|---|---|---|---|---|
| | 1st–4th bytes | 5th byte | 6th byte | 7th byte | 8th byte |
| Type of Lock | Locked_Address | Context_Number or Wild Card | Context_Class_ID | Object_ID or Wild Card | Null or Object_Class |
| Device Lock | Locked_Address | | | | |
| Context Lock | Locked_Address | A0 | (9F)*00 . . . 9E | 01 | |
| Specific Context | Locked_Address | (DF)*A0 . . . DE | (9F)*00 . . . 9E | 01 | |
| All Context of Same Context Class | Locked_Address | DE | (DF)*A0 . . . DE | 01 | |
| All Context in Device | Locked_Address | DE | 00 | 01 | |
| Object Lock | Locked_Address | (DF)*A0 . . . DE | (DF)*A0 . . . DE | (3F)*01 . . . 3E | <Any Value> |
| All Objects in Context Class | Locked_Address | (DF)*A0 . . . DE | (DF)*A0 . . . DE | 00 | <Any Value> |

Locking Devices

The ability to lock a device is dependent upon locks previously put into place. Device locking requires that all other locks be overwritten.

The Locking implementation uses the variables (IV) in the following table. The Locking_Address IV must be present in all implementations. The default level of persistence is "0." The following sub-sections contain a detail explanation of the IVs.

| IV | R/W | Type | Name |
|---|---|---|---|
| B (42) | R/W | N | persistence |
| E (45) | R/W | D | Key_Entry |
| G* (47) | R/W | D | Locking_Address |
| O (4F) | R/W | D | Unlock_Condition |

a) Persistence IV

The Persistence IV influences the device's unlock behavior. There are presently three defined persistence levels: (0) Loose; (1) Tight; and (2) Listening. The persistence IV has a default level of Loose. When a device reverts to an unlocked state it should set persistence to the default value.

A loose locking level occurs when the persistence level is "0." Loose locking results in a device discriminating between devices that attempt to control it. However, the binding is loose. This means that the locked device may grant the request for a new lock with confidence that the previous locking device must dissolve the pre-existing lock. When the locking level is loose, the locking device should automatically release the lock upon request. This results in fast disassociation of previous locks and granting of new locks.

When a loosely locked device receives a request to change the Locking_Address, it returns a completed message and sends a notification to the previous locking device to dissolve the lock. Loose locking infers any device can change the Locking_Address IV.

Tight locking occurs when the persistence field is set to "1"; this allows only the locking device to change or grant permission to change the Locking_Address IV. This is useful when a third device desires to create a lock with the locked device. In this case, the third device queries the locked device. The locked device sends an unlock message to the Lock Manager Object of the locking device. The locking device can either yield its lock or not yield its lock; that is the locking device returns a Completed Token, FE, when it dissolves the previous lock. Otherwise, the Locking Manager returns an FD Token with error-resource in use (8) code.

Setting the persistence IV to "2" results in a form of locking called listening (as described above). In listening, the "locked" device binds itself to another device. A device can implement various levels of persistence depending upon its application.

b) Key_Entry IV

The Key_Entry IV acts as a simple key into a locked device. This IV enables access to protected variables. This option can protect private functions, such as special diagnostic and setup operations, from general access. It also allows a device to discriminate between sources in the Listening application.

There are two uses of the Key_Entry IV. The first is when a tight lock, (persistence=1), is established. The locking device supplies a data type variable Key_Entry value that grants access to private areas of the device. This value is defined, for purposes of explanation, as the "lock_key."

The second is in a listening application, (persistence=2). The Listening Function uses the Key_Entry IV as an additional discriminator. An explanation of this Key_Entry function occurs later in this document.

In addition to the first level of privacy, a manufacturer can choose to make the Key_Entry IV a protected variable that requires authentication. This separates the issue of special access and authentication. The Key_Entry IV is inactive when a device is unlocked or the persistence is not set to "loose". The default key_entry value is "null". Whenever a device is unlocked or the persistence level is changed, the Key_Entry IV reverts to the default value. This results in only the locking device being able to supply or read a Key_Entry IV value. This allows only one device to access private data or functions.

Depending upon the application, the "lock_key" can be a fixed key, placed in ROM, or a writeable key, such as a "trusted key." Normally there is only one valid Key_Entry value; however, there can be multiple valid Key_Entry IV values. A manufacturer can choose to make the lock_key IV writeable. Protected devices become private again by setting the Key_Entry IV to an invalid entry (e.g., logical length is 0) or a false value, by disarming the lock, or changing the lock persistence <>1.

c) Locking_Address IV

The Locking_Address IV is a data type variable and is the network address that locked the device. In a CEBus application, the MAC address is used as the network address.

A locking device initiates a lock with a device when it writes its network address into the appropriate Locking Address IV. Once a lock is in place setting the Locking_Address IV to an invalid address (e.g., logical length is 0) disarms the lock. A lock request to a device that does not support locking results in a return Error—Invalid IV.

d) Unlock_Condition IV

A third variable is the Unlock_Condition IV which allows a user to specify a condition that automatically dissolves a lock. The unlock condition can use IV's found in the device, (this is similar to the Event Manager Object).

The Unlocking_Condition IV contains a Boolean expression that defines the unlock condition for the device. The Boolean expression is a CAL expression, as defined in the CAL grammar. This program is waiting for some condition to occur within the device, such as a timer expiration or threshold crossing. The device dissolves the lock upon the specified unlock condition. Note that the unlock condition is in the locked device. The persistence level can be either loose or tight.

A condition is loaded into the Unlock_Condition using the setArray method. In this case, the data being loaded is the actual CAL condition program. This program includes the condition to watch for that will cause the unlock action.

Just as in the Event Manager Object, there are two slight differences in the CAL grammar for the Unlocking_Condition IV to operate correctly. The first difference is identifying the instance variables to watch. Rather than a simple IV identifier, the context and object location of the IV must be supplied. For example, instead of testing (current_value>max_value), the Unlocking_Condition would test (Audio Context, Volume Control, current_value>Audio Context, Volume Control, max_value). By requiring all bytes, the statement can be correctly parsed.

The Boolean expression contained in Unlock_Condition allows for at most two relations to be evaluated. For example, the Clock Object could unlock when hour equals 12 or month equals 6. The first IV in the Boolean expression is the value reported. Along with the standard relational operators, an additional operator is defined, the DELTA operator. Note that when the Unlock_Condition IV is written to (using setArray Method), the object must check the validity of the condition being placed in the IV. If the condition is invalid, an Error-Bad Argument Type(12) is returned and no Unlock_Condition occurs.

Locking Implementation

A device is locked by setting the Locking_Address IV to a valid destination address using the setarray method. In the case of a CEBus application, the network address is composed of the Unit address and House Code appearing in MSB, LSB order. An example of a locking message using a Unit Code 0034, House Code 001A, results in the following message:

<context><object>46 471Ff5 Ff5 Ff4 34 Ff6 00 34 00 1A (<context><object>setArray 'GA'<DEL><DEL><DATA>34<ESCAPE>0034 001A)

Setting an object Locking_Address IV to an invalid address (e.g., logical length is 0) unlocks it.

(<context><object>setArray 'GA'<DEL><DEL><DATA>30<ESCAPE>)

An Error—Invalid IV is returned when this function is not supported.

1. Object Locking Implementation

Locking at the Object level is accomplished by setting the locking mechanism in the individual Object.

2. Context Locking Implementation

The object level locking is extensible to contexts. Locking at the context level is accomplish by setting the locking mechanism in the context control Object.

Setting the Locking_Address IV to a valid value locks the context. The objects instanciated in the context inherit the same Locking_Address. (This only applies when persistence <>2.) If an object within the context is already locked, the context cannot be locked unless the object Locking_Address IV value is the same as the context Locking_Address value.

The context lock is initiated by writing the network address of the locking device into the Context_Locking_Address IV placed in the Context Control Object.

<context_D>01 01 46 47 54 F5 F5 F4 34 F6<Locking_Address>

The Context_Persistence, Context_Key_Entry, Context_Locking_Address, and Context_Unlock_Condition IVs inherit their behavior from the Object IVs Persistence, Key_Entry, Locking_Address, and Unlock_Condition respectively.

3. Device Locking Implementation

Locking at the device level is accomplish by setting the device locking mechanism in the Node Control Object. The Node Control Object can have its own individual Object locking mechanism. The device level locking variables are

| | | | Node Control Object | (01) Node Control |
|---|---|---|---|---|
| | | | Variables in Node Control Object that allow for Device Locking | |
| IV | R/W | Type | Name | Context Function |
| o (6Fh) | R | d | object_list | list of objects used in context |
| z (6a) | R/W | N | Device_Persistence | Persistence |
| v (76) | R/W | D | Device_Key_Entry | Key_Entry |
| T* (54) | R/W | D | Device_Locking_Address | Locking_Address |
| V (56) | R/W | D | Device_Unlock_Condition | Unlock_Condition |

The Device_Persistence, Device_Key_Entry, Device_Locking_Address, and Device_Unlock_Condition IVs inherit their behavior from the Object IVs Persistence, Key_Entry, Locking_Address, and Unlock_Condition respectively.

The device lock is initiated by writing the network address of the locking device into the Device_Locking_Address IV.

00 01 46 54 F5 F5 F4 34 F6<Locking_Address>

Locking Scenarios

For the purposes of demonstration, the locking device is the device that desires to lock another device. The locked device is the device to be locked. Locking request can be made to either the device to be locked or to the lock manager holding the lock. Under normal conditions, a locking request is made by attempting to write a new address into the Locking_Address IV. The request can be either direct or conditional.

a) Direct Locking Request

An example of a locking message using a Unit Code 0034, House Code 001A, results in the following message: <context><object>46 4741 Ff5 Ff5 Ff4 34 Ff6 00 34 00 1A (<context><object>setArray 'G'<DEL><DEL><DATA>'4'<ESCAPE>0034 001A)

The device must determine if it is lockable. If the device, object, context is not locked a completed token FE is returned. The locking device places the locking pointer into the lock manger object.

b) Conditional Object Locking Request

An example of a locking message using a Unit Code 0034, House Code 001A, results in the following message: <context><object>56 47 F7<context><object>46 471 F5f5 Ff5 Ff4 34 Ff6 00 34 00 1A EB 44 47 F8 <context><object>I(IF "G"<BEGIN><context><object>setArray 'G'<DEL><DEL><DATA>'4'<ESCAPE>0034 001A <ELSE>setArray "G"<END>)

If the array "G" is not in use the device is locked. Otherwise, it will not lock the device. This method is used with resource locking. If the device is in use the requesting device can request "hail" the for the locking device to give up the lock. device by sending a broadcast message.

c) Using LOCK Macro U2

The LOCK Macro U2 is used to lock context and objects. The Macro message contains the Macro ID followed by the arguments list. There are two necessary arguments: (1) Locking_Address; and (2) persistence. An argument list is considered null if it is not filled. After a lock is established, the Key_Entry and Unlock_Condition IVs are updated.

<context_ID><object_ID>"U2" <data token><size of data><escape token><locking_address>F5<persistence>F5<Key_Entry>

As an example, for the CAL Macro message to lock a context 11:

"11 011 55U 322 F4 34 F6 0F 32 23 34 F5 01"

The argument 0Ff32 2334 is the locking address, the persistence is set to 1. At this point, the locking device can send Entry_Key IV data and a Unlock_Condition IV Data.

When the Locking_Address is not supplied it is assumed to be the source address of the Macro Message.

"11 01 55 32 F5 F5 01"

Locking Release Request a) Locking Release Request to Locking Master (1) using DISINHERIT (option 1)

If the object is locked, at either the object, context, or device level, then it will request that the impeding locks device relinquish its lock. The message is sent to the Locking Manger Object:

<Universal Context><Locking Manager Object>disinherit<lock_pointer (6C)>F4 [number of bytes] F6<device_address><context_id><object> disinherit the lock with <device><context><object>

The context_ID includes the context_number if it is not A0. If it is A0, the context number can be optionally included.

(2) Using UNLOCK Macro U41 (option 21)

The UNLOCK Macro U14 is sent to the EVENT Manager Object. The macro matches the desired locking pointer and request that it be deleted. If a match is present then the locking manager either grants the request or denied the request. If the locking device cannot be found, the locked device dissolves the lock. See section 2.1.2 for details.

Listening Implementation

The listening function is a companion to the reporting method. Listening is implemented in objects that are interested in the status of other devices or network resources. An example of a network resource is time.

A listening function allows a device to discriminate between broadcast messages containing status information. Listening function is a special application of the locking function. In the listening mode, the object does not inherit the locking state of the context or device. (This is necessary for listening function to perform correctly when a device or context is locked).

In Listening, a device binds itself to another device. This means a device can set its own Locking_Address IV. The Locking_Address IV is either read only or read/write. The write option is actually a type of loose locking. The persistence IV is set to "2." The Key_Entry IV acts as a special access discriminator. The following table contains the listening IV list.

Object Listening IV list

| IV | R/W | Type | Name | Context Function |
|---|---|---|---|---|
| G* (47) | R/W** | D | Locking_Address | object listening address |
| B* (42) | R | N | Persistence | 2 = Listening |
| E (45) | R/W | D | Key_Entry | allows special access |

When the Locking_Address is a read-only variable, the device sets its own locking address When the Locking_Address is set externally, the locking device does not place a lock_pointer in its Locking Manager.

There are three different implementations of listening. The first method uses the source network address to gate access to the listening object. The object discriminates in favor of the source device address corresponding to the Locking_Address IV. In this case, the message is written into the appropriate Instant Variable.

The second and third liste ning implementations utilize the Key_Entry device. This implementation requires macro message. The macro message, L1, is us ed to deliver the Key_Entry value and the data simultaneously. The listening device verifies that the macro is from the correct source address and that the supplied Key_Entry value matches the desired value.

1. Multi-Source Listening Implementations

There are occasions when a listening object ma y des ire to listen to all broadcast sources without discrimination. Once such situation occurs when a fire sensors broadcast that it is detecting a fire. It broadcast the information onto the network. A listening device wants to listen to all possible sources that would report a fire.

In a general, the multi-source listening application is implemented by allowing a device receive the state of any device (sensor). This is denoted by setting the Locking_Address IV to a broad cast address. In a CEBus application, the listening discriminator Is set to either all Unit_Addresses within a particular House Code or to all addresses on the network. The alarm author source or zone addresses included in the message; this can be extracted from the source_address field or a state vector contained in the message.

2. Listening via Key__Entry and Locking__Address

In this way, the lock__key value becomes a selector value that allows a device to discriminate between individual context and objects. For example, in the time context, the time type identifier can be supplied in the Macro Message. This value is checked for the desired time type. If a device has multiple instanciations of a reporting context, the device can include the context number in the Key__Entry field. The receiving node checks the incoming context number and verifies it is the one of interest.

<context__ID><object__ID>53 31 F4<size of data><escape token>5<Locking__Address>F5<data token><size of data><escape token><Key__Entry>F5<Argument__Listmessage>

In Listening, a device binds itself to another device. In the case of listening, a device can set its own Locking__Address IV. The Locking__Address IV can be either read only or read/write.

3. Listening via Key__Entry

Listening can also be accomplished by setting the Locking__Address to "00 00 00 00." In this case the only discriminator is the Key__Entry value. This allows an object to discriminate based on an access key. This is done as follows:

<context__D><object__ID>53 31 F5 00 00 00 00 F5<data token><size of data><escape token><Key__Entry>F5<Argument__List>

When the Locking Address is read only, the device exclusively sets its own locking address. When a Locking__Addresss IV is R/W the locking is loose. The locking device does not place a locking__pointer in its Locking Manager.

<context__ID><object__ID>L1<data token><size of data><escape token><Locking__Address>F5 F5<message>

There are some instances where a unique identifier is desired to allow discrimination between multiple context or objects in a single device. One example is a temperature sensor device that contains multiple sensors. It may be desirable to bind each sensor to a corresponding listening object. This is accomplished using the key__entry approach where if key__entry=null there is no discrimination. When Key__Entry is set to a value, the listening device requires the proper Key__Entry value before it will update the object.

EXAMPLE

Listening variable has a discriminator, like the key__entry number, which allows the user to set a discriminator. The data and discriminator are sent at Macro__ID key__entry F5 Listening DATA. If the Key__entry is not supplied, the discriminator is the network address.

While the invention has been described in detail with respect to numerous embodiments thereof, it will be apparent that upon a reading and understanding of the foregoing, numerous alterations to the described embodiment will occur to those skilled in the art and it is intended to include such alterations within the scope of the appended claims.

What is claimed is:

1. A first device comprising:

(a) means for communicating with at least one second device interconnected to the first device by a network bus, thereby creating a relationship between the first device and said second device, said means for communicating being capable of receiving query data from at least one third device;

(b) first means for storing information pertaining to the presistence of a relationship between the first device and the at least one second device;

(c) second means for storing information pertaining to a condition for terminating said relationship between the first device and the at least one second device;

(d) means for controlling operating modes of said first device in response to control data from said at lease one second device, said means for controlling being capable of processing said persistence information and said query data, and terminating the relationship between the first device and the at least one second device in response to one of said terminating condition and said query data, wherein information pertaining to the persistence of the relationship between the first electronic device and the second electronic device comprises one of at least two different persistence levels.

2. The first device recited in claim 1 wherein said persistence information comprises one of a first state wherein said relationship between the first device and the at least one second device is terminated in response to said query data, and a second state wherein said relationship between the first device and the at least one second device is maintained regardless of said query data.

3. The first device recited in claim 2 wherein said step of terminating said relationship between the first device and the at least one second device in response to said query data comprises forming a new relationship between said first device and said at least one third device.

4. The first device recited in claim 3 wherein said means for controlling is capable of polling said at least one second device, in response to the receipt of said query data to obtain permission to terminate said relationship between said first device and said at least one second device.

5. The first device recited in claim 4 wherein said means for controlling is further capable of monitoring the status of said at least one second device.

6. The first device recited in claim 5 wherein said means for controlling is further capable of enabling said at least one second device to alter information contained in said first device.

7. The first device recited in claim 1 wherein said condition for terminating said relationship is related to one of said relationship between said first device and said at least one second device, and an internal condition of said first device.

8. A first device comprising:

(a) means for communicating with at least one second device interconnected to the first device by a network bus, thereby creating a relationship between said first device and said at least one second device, said means for communicating capable of receiving query data from at least one third device;

(b) first means for storing information pertaining to the persistence of a relationship between the first device and the at least one second device, wherein said relationship information comprises one of a first state wherein said relationship is terminated in response to said query data, and a second state wherein said relationship is maintained regardless of said query data;

(c) second means for storing information pertaining to a condition for terminating said relationship between said first device and said at least one second device;

(d) means for controlling operating modes of said first device in response to control data from said at least one second device, said means for controlling capable of processing said persistence information and said query data, and terminating said relationship between said first device and said at least one second device in response to one of said terminating condition and said query data, wherein the information pertaining to the persistence of a relationship between the first device and one of the second or third devices comprises one of at least two different persistence levels.

9. A system having a plurality of first devices interconnected to one another by a network bus, each first device comprising:

(a) means for communicating with at least one second device over the network bus, thereby creating a relationship between said first device and said second device, said means for communicating being capable of receiving query data from at least one third device;

(b) first means for storing information pertaining to the persistence of said relationship between the first device and the at least one second device, wherein said relationship information comprises one of a first state wherein said relationship is terminated in response to said query data, and a second state wherein said relationship is maintained regardless of said query data;

(c) second means for storing information pertaining to a condition for terminating said relationship between said first device and said at least one second device;

(d) means for controlling operating modes of said first device in response to control data from said at least one second device, said means for controlling capable of processing said persistence information and said query data, and terminating said relationship between said first device and said at least one second device in response to one of said terminating condition and said query data.

10. A method for controlling a consumer electronic device connected on a network bus, the method comprising:

(a) communicating with at least one second device interconnected by a network bus to the consumer electronic device thereby creating a relationship between said consumer electronic device and said at least one second device;

(b) controlling operating modes of said consumer electronic device, at least one operating mode being controllable by said at least one second device on said network bus, thereby creating a relationship between said consumer electronic device and said at least one second device;

(c) storing information pertaining to a persistence of said relationship between said consumer electronic device and said at least one second device, and a predetermined condition pertaining to a condition for terminating said relationship;

(d) receiving query data from at least one third device;

(e) processing said information pertaining to the persistence of said relationship and said query data; and (f) terminating said relationship between said consumer electronic device and said at least one second device in response to one of said terminating condition and said query data, wherein the information pertaining to the persistence of a relationship between the first device and one of the second or third devices comprises one of at least two different persistence levels.

11. The method recited in claim 10 wherein the step of terminating said relationship further comprises creating a new relationship between said consumer electronic device and said at least one third device.

12. The method recited in claim 11 further comprising the step of polling said at least one second device to obtain permission to terminate said relationship between said consumer electronic device and the at least one second device.

13. The method recited in claim 12 further comprising the step of monitoring the status of said at least one second device.

14. The method recited in claim 13 further comprising the step of enabling said at least one second device to alter information contained in said consumer electronic device.

15. A system comprising:

a first device, said first device including a controller and a lock manager;

a second device coupled to the first device by a bus; and, a third device coupled to the first and second devices by the bus, wherein the controller and the lock manager of the first device operate to establish an exclusive communication relationship between the first device and one of the second or third devices, and wherein the lock manager stores information relating to the persistence of a relationship between the first device and one of the second or third devices, and p1 wherein the information relating to the persistence of a relationship between the first device and one of the second or third devices comprises one of at least two different persistence levels.

16. An electronic device comprising:

a controller for coordinating communications between the electronic device and other electronic devices coupled to the electronic device over a bus; and, a lock manager for establishing an exclusive communications link between the electronic device and one of the other electronic devices over the bus, said lock manager storing persistence information and termination information relating to said one of the other electronic devices, wherein persistence information composes one of at least two different persistence levels.

17. A method for controlling communications between electronic devices, comprising the steps of:

establishing between a first electronic device and a second electronic device a communications lock thereby prohibiting other electronic devices from communicating with the first electronic device;

storing information relating to the persistence of the relationship the first electronic device and the second electronic device;

maintaining the communications lock between the first and second electronic devices as long as at least one predetermined termination condition is not met; and terminating the communications lock between the first and second electronic devices if at least one predetermined termination condition is met, wherein the information relating to the persistence of the relationship between the first electronic device and the second electronic device comprises one of at least two different persistence levels.

* * * * *

UNITED STATES PATENT AND TRADEMARK OFFICE

CERTIFICATE OF CORRECTION

PATENT NO. : 6,504,847 B1
DATED : January 7, 2003
INVENTOR(S) : Karl Francis Horlander It is certified that error appears in the above-identified patent and that said Letters Patent is hereby corrected as shown below:

Column 17,
Line 34, insert the following paragraph:
-- wherein the information pertaining to the persistence of a relationship between the first device and one of the second or third devices comprises one of at least two different persistence levels. --

Column 18,
Line 28, after "and", delete "p1".

Signed and Sealed this

Twenty-fourth Day of June, 2003

JAMES E. ROGAN
*Director of the United States Patent and Trademark Office*